Jan. 24, 1961 W. W. SPOONER 2,969,204
APPARATUS FOR TENSIONING MATERIALS
Filed Nov. 22, 1957 7 Sheets-Sheet 1

INVENTOR
WILLIAM WYCLIFFE SPOONER
BY
Mead, Browne, Schuyler & Beveridge
ATTORNEYS Jan. 24, 1961 W. W. SPOONER 2,969,204
APPARATUS FOR TENSIONING MATERIALS
Filed Nov. 22, 1957 7 Sheets-Sheet 3

INVENTOR
William Wycliffe Spooner
BY
Mead, Browne, Schuyler & Beveridge
ATTORNEYS Jan. 24, 1961   W. W. SPOONER   2,969,204
APPARATUS FOR TENSIONING MATERIALS
Filed Nov. 22, 1957   7 Sheets-Sheet 4

—FIG.4.—

INVENTOR
William Wycliffe Spooner
BY
Mead, Browne, Schuyler & Beveridge
ATTORNEYS

FIG. 6.

Jan. 24, 1961 W. W. SPOONER 2,969,204
APPARATUS FOR TENSIONING MATERIALS
Filed Nov. 22, 1957 7 Sheets-Sheet 7

—FIG. 7.—

INVENTOR
William Wycliffe Spooner
BY
Mead, Browne, Schuyler & Beveridge
ATTORNEYS

United States Patent Office 2,969,204
Patented Jan. 24, 1961

2,969,204

APPARATUS FOR TENSIONING MATERIALS

William Wycliffe Spooner, Ilkley, England, assignor to The Spooner Dryer & Engineering Co. Limited, Ilkley, England Filed Nov. 22, 1957, Ser. No. 698,270

Claims priority, application Great Britain Feb. 9, 1957

22 Claims. (Cl. 242—75.2)

The present invention relates to apparatus for tensioning material such as binding material used in the manufacture of belting.

In many industries there arises a need for tensioning material, especially a moving strip of material, during or prior to its passage through an apparatus or during a process. Where the material has been supplied on reels or drums one method has been to apply a brake mechanism to the feed reel or drum but difficulty is experienced in maintaining the tension in the material substantially constant by virtue of the continuously changing diameter of the material on the drum or roller. This change in diameter of material on the drum or roller necessitates a substantially continual change in braking torque applied to the reel or drum in order to achieve substantially constant tension. Moreover, considerable difficulty is experienced in applying an initial tension to the material before it commences to be unwound from the reel or drum.

According to the present invention apparatus for tensioning material comprises a roller or drum for frictional engagement with said material and carried on a shaft with one end of the roller or drum freely rotatable relatively to the shaft whilst the other end has a driving connection with the shaft, means for applying a braking torque to said shaft, said shaft or said driving connection having resilience torsionally about the shaft axis, said resilience being operative between said braking torque-applying means and said roller or drum, and means for indicating relative angular displacement between the shaft and the roller or drum at said first-mentioned end.

The nature of the driving connection between the other end of the drum and the shaft is to some extent dictated by the magnitude of the tension to be applied to the material and the diameter of the drum or roller since these in combination determine the magnitude of the restraining torque to be applied. For some values of torque it may be sufficient to use one or more springs as said resilient member. The springs might be compression or tension helical springs acting between said other end of the drum or roller and a spider-like member fixed to the shaft. Yet again the resilient member might be in the form of a single spiral spring co-axial with the shaft and having one end connected thereto and its other end connected to said other end of the drum or roller. For larger values of torque it may be convenient to use the shaft itself as the resilient member and for said other end of the drum or roller to be clamped directly to the shaft.

Whatever form of resilient member is employed, when a tension is applied to material passing around the roller or drum there will be some relative angular displacement between the first or free end of the roller or drum and the adjacent portion of the shaft. If springs are employed as resilient members this angular displacement may be comparatively large within the range of torques envisaged and the magnitude of the relative angular displacement can be readily detected or relatively indicated by providing on the shaft adjacent the free or one end of the drum or roller a disc for rotation with the shaft relatively to the free end of the drum or roller. A graduated scale may be provided either on the disc or on the free end of the drum co-operating with a pointer on the free end of the drum or on the disc respectively. If the shaft itself is used as the resilient member then the magnitude of the angular displacement of the free end of the drum or roller relatively to the adjacent portion of the shaft may be insufficient to be observable directly and a linkage responsive to relative angular displacement between the free end of the drum or roller and an element fixed to the shaft may be used to magnify such relative angular displacement and impart to the disc a magnified angular displacement relatively to the free end of the drum or roller of a magnitude more suitable for observation. Such a linkage may include gears and gear segments.

The apparatus of the present invention may be used for applying a tension to material either when the material is stationary or when it is moving. The applying of tension to material when it is moving necessitates rotation of the roller or drum and the shaft and as observation of the relative angular displacement between the free end of the roller or drum and the adjacent portion of the shaft may not be possible during such rotation, one or more limit switches may be associated with the free end of the roller or drum and the disc so as to be responsive to the magnitude of the relative angular displacement between the free end of the roller or drum and the adjacent portion of the shaft. One such limit swtich may be responsive to a lower limit of applied tension and the other to an upper limit of applied tension.

Connections may be made to the limit switches via slip rings and they may be connected in a circuit for controlling the braking torque applied to the shaft.

In many cases braking torque may be applied to the shaft by a conventional drum and brake band friction brake. The band may be tensioned by a servo mechanism controlled by the limit switches. For example the brake band may be tensioned by a pneumatic piston and cylinder mechanism whilst the limit switches may control solenoid operated valves covering the admission of compressed air to or exhausting of air from the piston and cylinder mechanism. If desired a reservoir may be permanently connected to the piston and cylinder mechanism so as to enable smaller variations in the tensioning of the brake band to be obtained for the admission or exhaust through the valves of a given quantity of air.

In order to facilitate the initial application of tension to material passing round the roller or drum prior to its movement, that is, to tension the material whilst it is stationary, means are provided for rotating the shaft in a direction opposite to that in which it would be rotated when the material is movable or moving.

The apparatus of the present invention is for example eminently suitable for applying tension to the kinds of material used in the manufacture of belting. In a preferred form of apparatus the shaft is used as the resilient element and has a diameter of approximately 2¼", the roller or drum is approximately 1 ft. in diameter and has an axial length of about 72". It is found that when tensioning strip material of approximately 72" width passing round the roller or drum to the extent of 50 lbs. per inch width of materail, the torstional deflection between the shaft and the free end of the roller or drum amounts to approximately ½" when measured in terms of circumferential displacement between the disc and the free end of the drum or cylinder. The braking torque is applied to the shaft by a brake drum and brake band and, in order to reduce snatching, the shaft is connected to the brake through a 15 to 1 ratio step-up gear transmission.

The invention will be further described by way of example with reference to the accompanying drawings in which.

Figure 1:
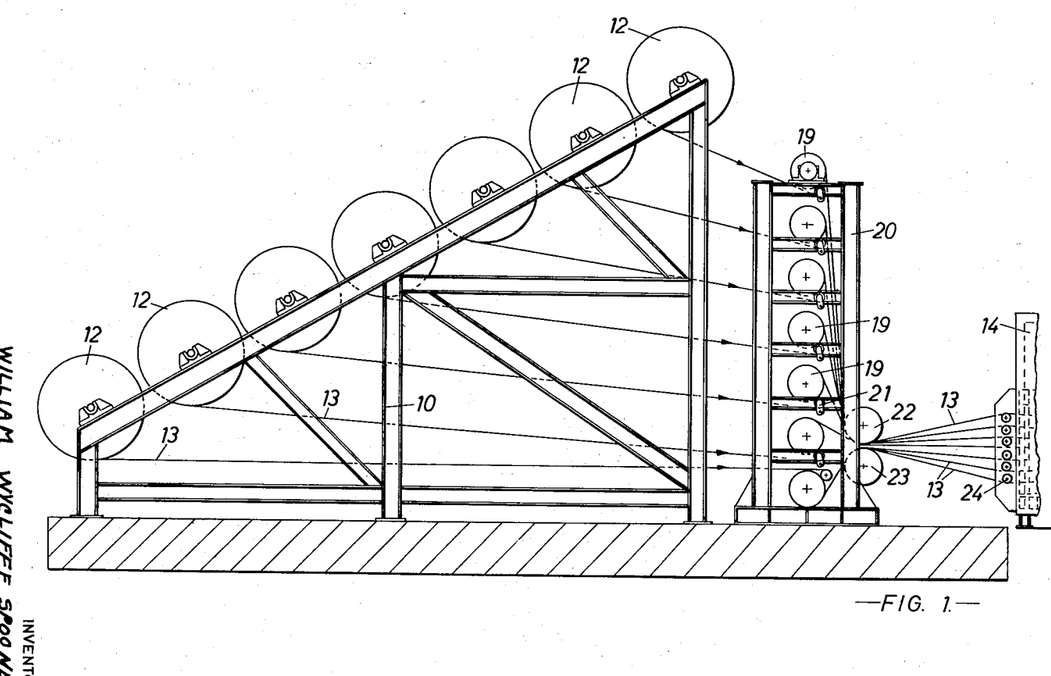
Fig. 1 shows diagrammatically the feeding and tensioning end of a belting manufacturing apparatus.
Figure 2:
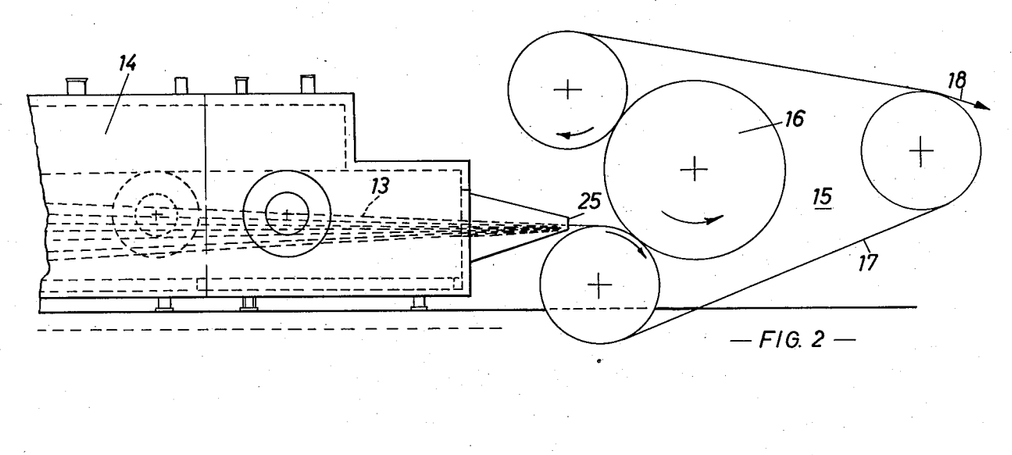
Fig. 2 is a continuation of Fig. 1 and shows a preheater and a curing apparatus for use in the manufacture of belting.

By way of example the invention will be described with reference to its application to apparatus for the manufacture of multi-ply belting. One form of apparatus for manufacturing multi-ply belting is illustrated in outline in Figs. 1 and 2 and comprises a reel-off stand 10 carrying a plurality of reels 12 each feeding a ply 13 of plastic impregnated material for the belting, a preheater 14 for preheating the individual plies and a heat curing machine 15 in which the plies are passed around a roller 16 and urged in contact therewith by an endless steel belt 17 and emerge at 18 bonded to one another. Whereas hitherto it has been common for tension to be applied to each of the plies 13 by providing a friction brake to each of the drums 12, according to the present invention each of the plies 13 passes over a tensioning roller 19, the rollers 19 associated with each of the plies 13 being assembled together and carried in a common framework 20. The path of each ply from its reel 12 to the preheater 14 lies around a jockey roller 21, around a tensioning roller 19, between two guide rollers 22, 23, and then over or under a guide roller 24 individual to each ply at the entrance to the preheater 14. As may be seen more clearly in Fig. 2, in the preheater the plies 13 converge towards one another and are brought into contact with one another generally in the region of the outlet 25.

Figure 3:
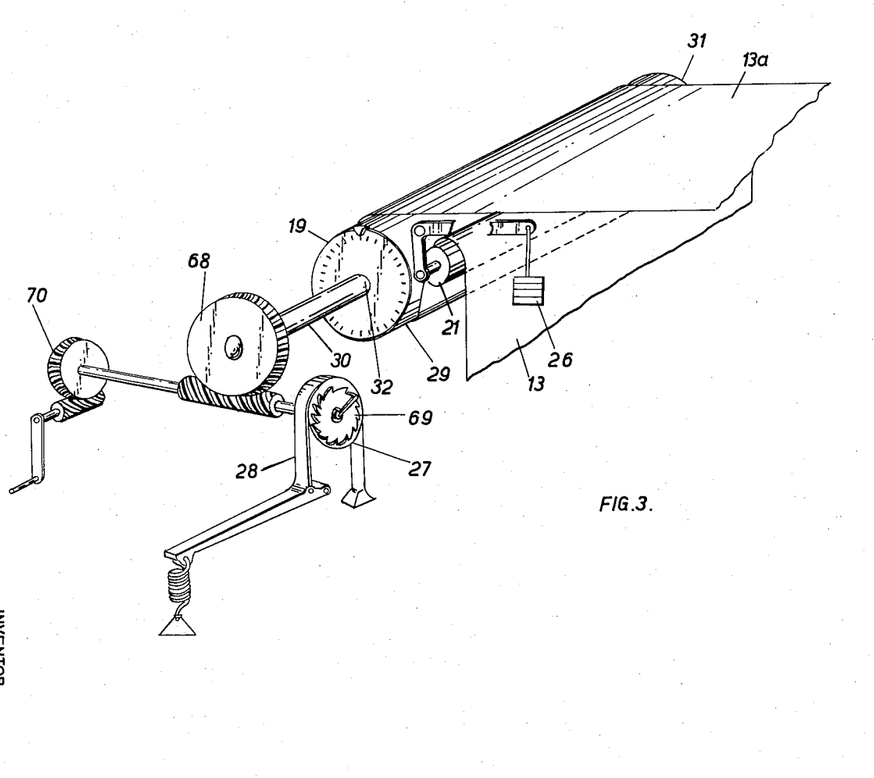
Fig. 3 is a diagrammatic perspective view of a material tensioning apparatus according to the invention.

The path of a ply around a tensioning roller 19 can be more clearly seen from Fig. 3 wherein it will be seen that a ply of material 13 passes initially around a jockey roller 21 and then around a tensioning roller 19. The jockey roller 21 is preferably urged towards the tensioning roller 19 such as by weights 26 so as to maintain the ply 13 in frictional engagement with the surface of the roller 19. By applying a restraining or braking torque to the tensioning roller 19 by means such as a brake drum 27 and a brake band 28 tension can be applied to the portion 13a of the ply after the tensioning roller 19. By arranging for one end 29 of the tensioning roller 19 to be freely rotatable relatively to a torsionally resilient shaft 30 substantially coaxial therewith and for the other end 31 of the tensioning roller 19 to have a driving connection with the shaft 30, the magnitude of the tension in the portion 13a of the ply can be deduced from observation of the degree of angular rotation of the free end 29 of the tensioning roller 19 relatively to the adjacent portion 32 of the shaft 30.

Figure 4:
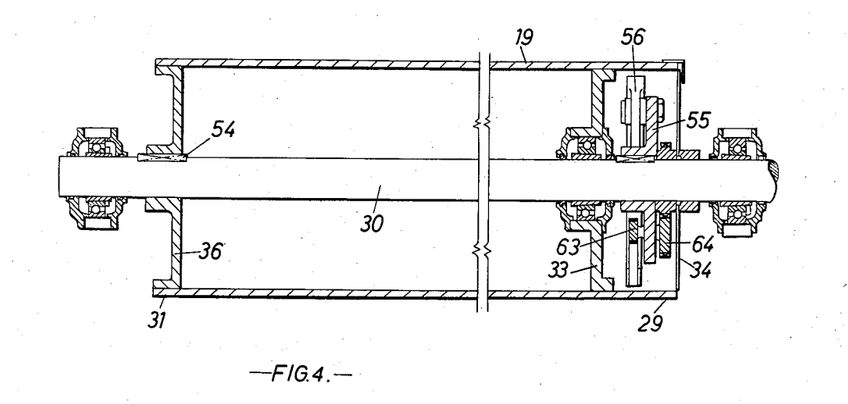
Fig. 4 is a sectional view of the tensioning roller and shaft of the embodiment of Fig. 3.
Figure 5:
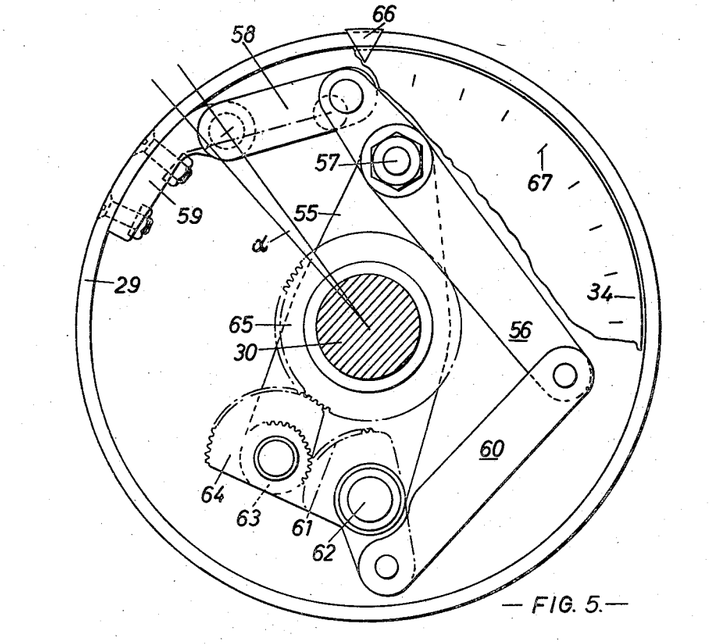
Fig. 5 is an end view partly in section of a magnifying mechanism used in the embodiment of Fig. 4.

As illustrated in more detail in Figs. 4 and 5 the free end 29 of the roller 19 is carried on an end member 33 freely rotatable about the shaft 30 and a second end member 36 carrying the other end 31 of the roller 19 is keyed to the shaft 30 at 54. Intermediate the end member 33 and the disc 34 there is keyed to the shaft 30 a spider 55. As may be more clearly seen from Fig. 5, a lever 56 pivoted to the spider 55 at 57 is connected by a link 58 to a lug 59 bolted to the end 29 of the roller. The other end of the lever 56 is connected by a link 60 to a toothed quadrant 61 pivoted to the spider at 62 and meshing with a pinion 63. Associated with the pinion 63 for rotation therewith is a quadrant 64 meshing with a gear wheel 65 freely rotatable on the shaft 30 and connected to the disc 34. By means of the lever, links, quadrants, pinion and gear wheel the relative angular movement between the free end 29 of the roller and the spider 55 keyed to the shaft 30 appears as a magnified movement of the disc 34 relatively to the free end 29. The degree of magnification may be ten times or more as desired. For example an angular displacement of the free end 29 relatively to the shaft 30 indicated by the angle $\alpha$ can be magnified to cause a corresponding displacement of the disc 34 relatively to the free end 29 of the roller of about 90°. The free end 29 of the roller may be provided with a pointer 66 and a scale may be provided on the disc 34 as indicated at 67. In an alternative embodiment, illustrated in Figs. 6 and 7, the end 29 of the tensioning roller 19 is carried on an end member 33 freely rotatable about the shaft 30, whilst by means of a collar 35 a disc 24a is secured to the portion 32 of the shaft 30 adjacent the free end 29. The free end 29 overhangs the end member 33 and the disc 34a is received at least partially within this overhanging portion. The other end 31 of the tensioning roller 19 is carried on a second end member 36a rotatable about the shaft 30 and connected to one end 37 of a spring 38, the other end of which is attached to a collar 39 keyed to the shaft 30. The tension in a ply in frictional engagement with the roller 19 gives rise to a torque between tensioning roller 19 and the shaft 30 and its magnitude can be observed in terms of the angular displacement between the free end 29 and the disc 34a.

Figure 7:
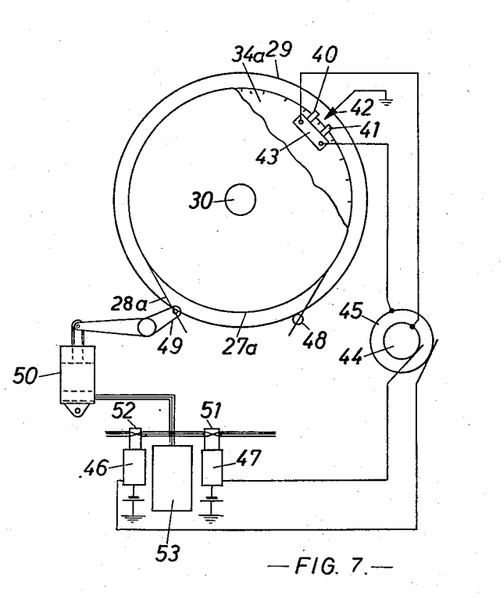
Fig. 7 is a diagrammatic illustration of one form of control apparatus as applied to the embodiment of Fig. 6.

One arrangement whereby the angular displacement between the disc 34a and the free end 29 can be utilized to automatically control the magnitude of the braking torque applied to the shaft 30, and thereby the magnitude of the tension in the ply, is illustrated in Fig. 7. In Fig. 7 the brake drum 27a is partially cut away to reveal the disc 34a. The disc 34a carries a pair of contacts 40, 41 and the free end 29 of the roller carries a fixed contact 42. The contacts 40 and 42 jointly serve as a lower limit switch and the contacts 41 and 42 jointly serve as an upper limit switch. The contacts 40 and 41 are mounted on an insulating carrier 43 which is movable circumferentially on the disc 34a into any desired postion and the contacts 40 and 41 are displaceable relatively to one another in accordance with the desired tolerance of the applied tension. The contact 42 is connected to one side of an electricity supply, conveniently through the metal parts of the apparatus which are earthed, and the contacts 40 and 41 are connected via slip rings 44, 45 respectively to one end of solenoid coils 46, 47 respectively, the other ends of which are connected to the other side of the electricity supply. Also connected to the shaft 30 is a brake drum 27a around which is a brake band 28a of which one end is anchored at 48 whilst the other end is connected to one arm of a bell-crank lever 49 and the other arm of which is connected to the piston of a piston and cylinder mechanism 50. The solenoid 47 controls a normally closed valve 51 for admitting air under pressure to the cylinder of the piston and cylinder mechanism 50 whilst the solenoid 46 controls a normally closed valve 52 for permitting the release of air from the cylinder. In order to obtain finer control, the cylinder of the piston and cylinder mechanism 50 is preferably permanently connected to a reservoir vessel 53 of comparatively greater volume so that relatively larger quantities of air must be admitted or discharged from the cylinder in order to effect a given movement of the piston on change in braking torque.

In operation, with the contacts 40 and 41 adjusted as desired relatively to one another and relatively to the disc 34a, if the applied tension in the ply decreases by more than a given amount from the desired value, contact 42 engages contact 40 thereby completing a circuit for the solenoid 47. Valve 51 opens and more air is admitted to the cylinder of the piston and cylinder mechanism 50 to increase the tension applied to the brake band 28a and thereby increase the braking torque applied to the shaft 30. Similarly if the applied tension in the ply increases by more than a given amount from a desired value contact 42 will engage contact 41 and valve 52 will be opened to release air from the cylinder of the piston and cylinder mechanism 50.

Figure 6:
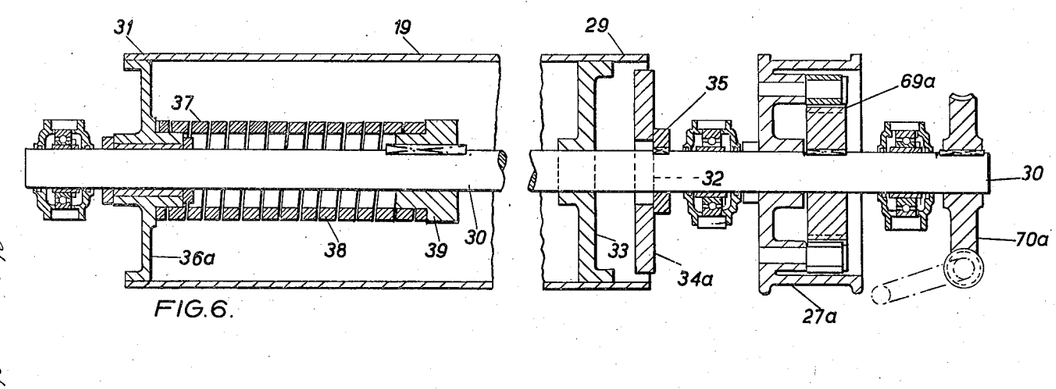
Fig. 6 is a sectional view of a tensioning roller and shaft in an alternative embodiment of the invention.

For small values of applied tension, the spring 38 of Fig. 6 may be sufficiently strong and at the same time provide a sufficient deflection to be directly observable. However, for large values of applied tension such as may be encountered with plies for the manufacture of belting, the shaft 30 may be used as a resilient element as in the embodiment of Figs. 3, 4 and 5 in place of the spring 38 of Fig. 6, though the relative angular displacement between the free end of the roller and the adjacent portion of the shaft will be relatively smaller so that a mechanism for magnifying this displacement is necessary.

In cases where the braking torque applied to the shaft 30 is large and the speed of movement of the ply small, in order to reduce any tendency for brake snatching it is desirable for the shaft 30 to be connected to the brake drum 27 through a step-up gear transmission as indicated at 68 in Fig. 3, so that the speed of rotation of the drum 27 is greater than that of the shaft 30 and the braking torque required on the drum 27 is correspondingly less.

In order that the ply 13 passing round the roller 19 can be initially drawn taut and tensioned after its leading end has been threaded through the preheater etc., a reduction gear 70 or 70a is provided and a one way clutch 69 or 69a is included between the brake drum 27 and the shaft 30. After the ply has initially been drawn taut manually, an initial tension is effected in the portion 13a of the ply by rotating the shaft 30 in the opposite direction to that in which it is rotated when the apparatus is in operation. Such reverse rotation of the shaft 30 may be effected manually or under power through the worm and worm wheel reduction gear 70 or 70a.

It will be understood that the application of the invention to apparatus for the manufacture of multi-ply belting is by way of example only as the apparatus of the present invention can be readily applied to other industries or processes in which it is required to apply a tension to a strip material either stationary or moving.

I claim:

1. Apparatus for tensioning material such as binding material used in the manufacture of belting, comprising, in combination, a drum for frictional engagement with said material, a rotatable and torsionally resilient shaft supporting said drum, one end of said drum being freely rotatable relatively to said shaft, means for clamping the other end of said drum directly to said shaft, means for applying a braking torque to said shaft at a region thereof beyond said one end of said drum, and means for indicating relative angular displacement between said shaft and said drum in the region of said first mentioned end of said drum.

2. Apparatus for tensioning material such as binding material used in the manufacture of belting, comprising, in combination, a drum for frictional engagement with said material, a torsionally resilient shaft supporting said drum, one end of said drum being freely rotatable relatively to said shaft, means for clamping the other end of said drum directly to said shaft, means for applying a braking torque to said shaft at a region thereof beyond said one end of the drum, a disc rotatable about said shaft in the region of said one end of said drum, an element fixed to said shaft in the region of said one end of said drum, and linkage responsive to relative angular displacement between said one end of said drum and said element for imparting a magnified angular displacement to said disc.

3. Apparatus for tensioning material both when moving and when stationary, comprising, in combination, a roller for frictional engagement with said material, a rotatable shaft supporting said roller, bearings supporting said shaft, one end of said roller being freely rotatable relatively to said shaft, said shaft serving as a resilient member, means for clamping the other end of said roller directly to said shaft, a brake drum, transmission gearing between said brake drum and a portion of said shaft beyond said one end of said roller, means for frictionally engaging said brake drum for applying a braking torque to said shaft, a disc rotatable about said shaft in the region of said one end of said roller, an element fixed to said shaft in the region of said one end of said roller, linkage connecting said fixed element, said one end of said roller and said disc and responsive to relative angular displacement between said one end of said roller and said element for imparting a magnified angular displacement to said disc relative to said one end of said roller, means for adjusting said brake drum engaging means, a one-way clutch between said brake drum and said shaft, and means for rotating said shaft in a direction opposite to that in which it would be rotated when said material is moving whereby also to apply tension to said material in frictional engagement with said roller when stationary.

4. Apparatus for tensioning material, comprising, in combination, a roller for frictional engagement with said material, a rotatable and torsionally resilient shaft carrying said roller, one end of said roller being freely rotatable relatively to said shaft, a driving connection between the other end of said roller and said shaft, brake means for applying a braking torque in one direction to said shaft, manual adjustment actuating means for said brake means, and means for rotating said shaft in a direction opposite to that in which it would be rotated when said material is moving whereby also to apply tension to material when stationary and in frictional engagement with said roller, said brake means being inoperative for rotation of said shaft in said opposite direction.

5. Apparatus for tensioning material, comprising a roller for frictional engagement with said material, a shaft member carrying said roller, one end of said roller being freely rotatable relatively to said shaft member, a driving connection member between the other end of said roller and said shaft member, one of said members being resilient whereby the transmission of torque between said roller and the end portion of said shaft member adjacent said one end of said roller causes a relative angular displacement between said one end of said roller and the portion of said shaft member thereadjacent, and means for applying a braking torque to said shaft member to cause said angular displacement.

6. Apparatus according to claim 5 comprising a disc attached to the portion of said shaft member adjacent said one end of said roller for indicating said relative angular displacement therebetween.

7. Apparatus according to claim 5 comprising a disc rotatable about the portion of said shaft member adjacent said one end of said roller, and linkage means coupling said disc, said one end of said roller and said portion of said shaft member thereadjacent and responsive to said relative angular displacement for imparting a magnified angular displacement to said disc.

8. Apparatus according to claim 7 in which said disc has a graduated scale and said roller carries a cooperating pointer on said one end thereof.

9. Apparatus according to claim 5 comprising means including electric circuit means for controlling the braking torque applied to said shaft member by said braking torque applying means, and in said electric circuit means at least one limit switch responsive to said relative angular displacement.

10. In material-tensioning apparatus: a roller for frictional engagement with said material; a shaft member carrying said roller, one end of said roller being freely rotatable relatively to said shaft member; a driving connection member between the other end of said roller and said shaft member; and means for applying a braking torque to said shaft member to restrain said shaft member against torque applied to said roller by tension in said material, one of said members having resilience torsionally about the axis of said shaft member, said resilience being operative between said roller and said braking torque-applying means.

11. Apparatus as set forth in claim 10 in which said shaft member is torsionally resilient and said braking torque is applied to said shaft member at a portion thereof projecting beyond said one end of said roller.

12. In material-tensioning apparatus: a roller for frictional engagement with said material; a shaft member carrying said roller, one end of said roller being freely rotatable relatively to said shaft member; a driving connection member between the other end of said roller and said shaft member; means for applying a braking torque to said shaft member to restrain said shaft member against torque applied to said roller by tension in said material, one of said members having resilience torsionally about the axis of said shaft member, said resilience being operative between said roller and said braking torque-applying means; and means associated with said one end of said roller and with the portion of said shaft member thereadjacent for indicating relative angular displacement therebetween.

13. Apparatus as set forth in claim 12 in which said braking torque-applying means comprises a brake drum on said shaft member, a friction brake band for frictional engagement with said brake drum and means for tightening said brake band on said drum.

14. Apparatus as set forth in claim 12 in which said braking torque-applying means comprises a rotary brake and a step-up gear from said shaft member to said rotary brake.

15. In apparatus for the manufacture of multiply belting comprising a reel-off stand adapted to carry a plurality of reels of plastic impregnated material, a preheater for heating the separate plies of material reeled-off from said stand, a heat curing machine for pressing together and bonding the heated plies: the improvement comprising a roller for frictional engagement with said material before it enters said preheater for tensioning said material, a shaft member carrying said roller, one end of said roller being freely rotatable relatively to said shaft member, a driving connection member between the other end of said roller and said shaft member, one of said members being resilient whereby the transmission of torque between said roller and the end portion of said shaft member adjacent said one end of said roller causes a relative angular displacement between said one end of said roller and the portion of said shaft member thereadjacent, and means for applying a braking torque to said shaft member to cause said angular displacement.

16. Apparatus according to claim 1 in which said means for indicating said relative angular displacement between said shaft and said drum includes magnifying means for magnifying said relative angular displacement before indication thereof.

17. Apparatus according to claim 5 in which said driving connection member is said resilient member and comprises a spiral spring coaxial with said shaft and disposed therearound, one end of said spring being connected to said shaft member and the other end of said spring being connected to said other end of said roller.

18. Apparatus as set forth in claim 10 in which said driving connection member has said resilience torsionally about the axis of said shaft member.

19. Apparatus as set forth in claim 10 including adjustment actuating means for said braking torque applying means and control means responsive to relative angular displacement between said one end of said roller and the portion of said shaft member thereadjacent and controlling said adjustment actuating means.

20. The apparatus set forth in claim 12 in which said relative angular displacement indicating means includes electrical circuit means and at least one limit switch responsive to relative angular displacement between said one end of said roller and the portion of said shaft member thereadjacent for controlling the braking torque applied to said shaft member by said braking torque applying means.

21. The apparatus set forth in claim 12 in which said braking torque applying means comprises a brake drum on said shaft member, a frictional brake band for frictional engagement with said brake drum, a piston and cylinder mechanism for tightening said brake band and electromagnetically operable valve means controlling said piston and cylinder mechanism, and in which said relative angular displacement indicating means comprises upper and lower limit switches responsive to relative angular displacement between said one end of said roller and said portion of said shaft member thereadjacent and electrical circuit means connected to said valve means and to said limit switches for controlling said valve means and thereby the applied torque responsively to said relative angular displacement.

22. The apparatus according to claim 21 which includes a one-way clutch between said brake drum and said shaft member and means for manually rotating said shaft member in the opposite direction to its normal direction of rotation when tensioned material is being drawn from said roller.

References Cited in the file of this patent
UNITED STATES PATENTS
2,740,459   Kilborn ______________ Apr. 3, 1956